United States Patent
Schemmel et al.

(10) Patent No.: US 12,355,317 B2
(45) Date of Patent: Jul. 8, 2025

(54) SLOT INSULATION SYSTEM FOR AN ELECTRICAL ROTATING MACHINE, METHOD FOR PRODUCING A SLOT INSULATION SYSTEM

(71) Applicant: Siemens Mobility GmbH, Munich (DE)

(72) Inventors: Florian Schemmel, Nuremberg (DE); Steffen Lang, Hallerndorf (DE); Marek Maleika, Fürth (DE); Niels Müller, Georgensgmünd (DE)

(73) Assignee: SIEMENS MOBILITY GMBH, Munich (DE)

( * ) Notice: Subject to any disclaimer, the term of this patent is extended or adjusted under 35 U.S.C. 154(b) by 0 days.

(21) Appl. No.: 18/546,393

(22) PCT Filed: Feb. 15, 2022

(86) PCT No.: PCT/EP2022/053675
§ 371 (c)(1),
(2) Date: Aug. 14, 2023

(87) PCT Pub. No.: WO2022/175264
PCT Pub. Date: Aug. 25, 2022

(65) Prior Publication Data
US 2024/0136900 A1 Apr. 25, 2024
US 2024/0235346 A9 Jul. 11, 2024

(30) Foreign Application Priority Data
Feb. 22, 2021 (DE) ...................... 10 2021 201 666.9

(51) Int. Cl.
*H02K 3/34* (2006.01)
*H02K 3/40* (2006.01)
(Continued)

(52) U.S. Cl.
CPC ............ *H02K 15/12* (2013.01); *H02K 3/345* (2013.01); *H02K 3/40* (2013.01); *H02K 15/10* (2013.01)

(58) Field of Classification Search
CPC .......... H02K 3/345; H02K 3/40; H02K 15/12; H02K 15/10
See application file for complete search history.

(56) References Cited

U.S. PATENT DOCUMENTS 3,777,198 A * 12/1973 Anderson ................ H02K 3/32
310/43
5,623,174 A 4/1997 Markovitz ....................... 310/45
(Continued)

FOREIGN PATENT DOCUMENTS

DE 2115336 10/1972 ............... H02K 3/36
EP 2907224 B1 * 4/2018 ............... H02K 3/34
(Continued)

OTHER PUBLICATIONS

Fort, E.M., et al., "Rotating Machine Insulation". XEEE Transactions on Electrical Insulation, vol. 25 No. 1, Feb. 1990, 137-140.*
(Continued)

*Primary Examiner* — Bret P Chen
(74) *Attorney, Agent, or Firm* — Slayden Grubert Beard PLLC

(57) ABSTRACT

The present disclosure describes slot insulation systems for electrical rotating machines. For example, a system may include: a main insulation for a coil of the rotating machine or for an individual bar for the coil; a resin formulation serving as a slot adhesive forming a solid film. At room temperature and under standard conditions, the solid film is in an A-state. Heating the electrical rotating machine to a curing temperature for the resin formulation, the solid film (Continued)

firstly melts and flows within an occupied slot, then cures and solidifies to form a thermoset material.

14 Claims, 2 Drawing Sheets

(51) Int. Cl.
    *H02K 15/10*      (2006.01)
    *H02K 15/12*      (2006.01)

(56) References Cited

U.S. PATENT DOCUMENTS

| | | | | |
|---|---|---|---|---|
| 6,130,496 | A * | 10/2000 | Takigawa | H02K 3/345 |
| | | | | 310/196 |
| 6,140,733 | A | 10/2000 | Wedde | 310/196 |
| 6,361,632 | B1 | 3/2002 | Emery | 156/56 |
| 7,294,788 | B2 * | 11/2007 | Yoshida | H02K 3/345 |
| | | | | 174/120 R |
| 2005/0101695 | A1 * | 5/2005 | Wada | H02K 3/345 |
| | | | | 174/120 SR |
| 2009/0078450 | A1 | 3/2009 | Miller | 174/209 |
| 2011/0245412 | A1 | 10/2011 | Schubert | 524/588 |
| 2012/0080976 | A1 * | 4/2012 | Oka | H02K 3/522 |
| | | | | 310/215 |
| 2014/0034256 | A1 * | 2/2014 | Fujimori | D21H 5/12 |
| | | | | 162/138 |
| 2014/0326481 | A1 | 11/2014 | Gröppel | H01B 3/04 |
| 2017/0012485 | A1 * | 1/2017 | Pal | H02K 3/38 |
| 2018/0138772 | A1 | 5/2018 | Calebrese | H02K 3/34 |
| 2018/0198354 | A1 * | 7/2018 | Hölscher | H02K 15/045 |
| 2019/0280549 | A1 | 9/2019 | Inoue | H02K 3/37 |
| 2020/0403475 | A1 | 12/2020 | Huber | H02K 3/40 |
| 2021/0035705 | A1 | 2/2021 | Huber | H01B 3/46 |
| 2024/0318032 | A1 * | 9/2024 | Maleika | C08G 59/3281 |

FOREIGN PATENT DOCUMENTS

| | | | | |
|---|---|---|---|---|
| JP | 59-117434 | * | 7/1984 | H02K 3/34 |
| JP | 10-265714 | * | 10/1998 | C09D 5/03 |
| WO | 2011 157671 | | 12/2011 | C08G 59/40 |

OTHER PUBLICATIONS

Frost, Nancy, et al., "Considerations for Rotating Low-Voltage Machine Insulation Designs". Conference record of IEEE International Symposium on Electrical Insulation 2008, pp. 571-574.*

Kurimsky, Juraj, et al., "Partial Discharge Analysis for Insulation Systems of Electric Rotating Machines With Various Voltage Stress". Acta Electrotechnica et Informatica vol. 8, No. 4, 2008, 64-67.*

Elmotec Statomat brochure: "Manufacturing Process: Slot Insulation", pp. 1-15 (blank pages included). No citation or date available.*

Nair, Ramesh P., et al., "Identification of slot discharges in rotating machine insulation system using variable frequency PD measurement". High Voltage, 2018, vol. 3 Iss. 3, pp. 179-186.*

Chapman, Michael, et al., "Insulation Systems for Rotating Low-Voltage Machines". Conference Record of the 2008 IEEE International Symposium on Electrical Insulation, Vancouver, BC, Canada, 2008, pp. 257-260.*

Search Report for International Application No. PCT/EP2022/053675, 12 pages, Jun. 9, 2022.

Search Report for DE Application No. 10 2021 201 666.9, 14 pages, Nov. 5, 2021.

* cited by examiner

SLOT INSULATION SYSTEM FOR AN ELECTRICAL ROTATING MACHINE, METHOD FOR PRODUCING A SLOT INSULATION SYSTEM

CROSS-REFERENCE TO RELATED APPLICATIONS

This application is a U.S. National Stage Application of International Application No. PCT/EP2022/053675 filed Feb. 15, 2022, which designates the United States of America, and claims priority to DE Application No. 10 2021 201 666.9 filed Feb. 22, 2021, the contents of which are hereby incorporated by reference in their entirety.

TECHNICAL FIELD

The present disclosure relates to insulation systems. Various embodiments include slot insulation systems for an electrical rotating machine, particularly having a design voltage in excess of 700 V, and/or methods for producing such a slot insulation system.

BACKGROUND

Electrical rotating machines, e.g. electric motors and generators of this type comprise a rotor, which is enclosed by a stator. The stator comprises a plate stack, in which slots are provided into which electrical conductors in the form of coils, or in the form of individual bars which are welded or soldered into coils, are inserted. In each case, two corresponding individual bars can be welded together to form a coil. Electrical conductor elements are mutually insulated within the coil, the coil is additionally provided with a main insulation comprised of mica-based insulating tapes and, finally, depending upon the voltage level, is further provided with an optional conductive coil-side corona shielding and/or overhang corona shielding, such that the surface of the coil lies at the same potential as the plate stack. This design layout is also described as a "uniform" winding, conversely to electrical rotating machines having wires in a "scrambled" winding, which generally applies to electrical rotating machines having a design voltage lower than 700 V.

The winding of these electrical rotating machines is subject to a multiplicity of loads. The coil is subject to mechanical loading in the form of mechanical impact loads, in-service vibrations and electrodynamic forces. By means of a coil-side corona shielding (German: "Außenglimmschutz" or "AGS"), which is required in electrical rotating machines having a design voltage in excess of 4 kV and is optionally provided at lower design voltages and, optionally, by means of an overhang corona shielding (German: "Endenglimmschutz" or "EGS") of the slot insulation system which is contained therein, and which is required at even higher voltages, it is endeavored that electric field decay between the plate stack and the coil winding, insofar as possible, should be discharge-free, as discharges can potentially damage or destroy the slot insulation system.

In order to fulfil these requirements, an electrical coil is rigidly secured in the stator slot by means of a slot adhesive and/or by means of a slot packing strip, wherein both options are possible, in the case of an individual bar production process, or by means of a resin, for example using the global vacuum pressure impregnating process. As a result, the coils, and thus the winding, are more rigid and more resistant to mechanical loads.

Conversely to the global VPI method, in the present case, the production of an individual bar or an individual coil is considered, for example, wherein insulation is produced in a single VPI, or "SVPI" process, prior to the insertion of the ready-insulated individual bar or coil into the slot of a plate stack.

FIG. 1, which represents the voltage characteristic, shows a comparison between a coil-side corona shielding-coated and a non-coil-side corona shielding-coated individual bar of a machine having a design voltage in excess of 4 kV. In the absence of coil-side corona shielding, voltages can occur which are discharged in an air gap, thereby resulting in the damage and/or destruction of insulation.

FIG. 1, at the top, shows the plate stack 1, with a ground connection 2. Along the line shown in bold, on the main insulation 4 of a copper conductor element 5, a coil-side corona shielding AGS 3 is arranged by way of a layer with a deliberately set conductivity. In the region 6 adjoining the coil-side corona shielding 3, no coil-side corona shielding is present on the main insulation 4. Consequently, in this location, the main insulation 4 and the connected plate stack 1 are not at the same potential, such that discharges 7 occur in the air gap represented.

These discharges attack the main insulation 4, resulting in damage and, ultimately, in the total failure of the main insulation 4. Consequently, an equipotential coil-side corona shielding 3 is essential. At the bottom of the figure, the characteristic of the main insulation surface voltage 8 is represented. In the region which is provided with coil-side corona shielding 3, this characteristic lies below the partial discharge inception voltage, which is represented by the broken line but, in the region 6 having no coil-side corona shielding 3, the main insulation surface voltage 8 reaches and exceeds this broken line 9.

For the production of an insulated individual bar, firstly, the uniform winding, i.e. the conductors with their conductor element insulation, which is comprised of insulating tapes, by means of powder coating and/or other surface insulation materials, is provided with an insulating coating and/or serving and/or impregnation in a VPI process—see FIG. 2 which, as per FIG. 1, shows a conventional slot which is occupied by an insulated individual bar, according to the prior art.

FIG. 2 shows a cross-section through a filled slot 10 in a plate stack 1, of the known type represented in FIG. 1. The example represented here is an insulation system which, nowadays, is customarily employed in the traction sector. This involves rotating electrical machines having a design voltage of approximately 4 kV which require no corona protection such that, in this case, neither coil-side corona shielding nor overhang corona shielding are represented. From bottom to top, the following details can be seen from this view, which is consistent with the prior art: at the slot bottom, a bottom strip 11 is located. The next arrow shows the interior of the conductor region, where the copper layers of the conductor elements 12 are represented. Around each conductor element 12, a conductor element insulation 13 is arranged, which is formed by a thin winding tape. Between two distinct assemblies of conductor elements 12, a separating element 14 is arranged. A conductor element assembly 12, with associated conductor element insulation 13, is secured by means of a mica tape 15. This winding, with its mica tape 15, is enclosed by a "top tape" 16. A plurality of assemblies of mutually insulated conductor elements, having protective mica tape 15 and top tape 16, together with a slot liner 17, are inserted into a slot. Top-end closure is formed by a slot closing strip 18.

From the bottom strip 11 to the top tape 16, FIG. 2 shows a ready-insulated coil arranged in a slot. Elements of an insulated coil are described with reference to the reference numbers 12 to 17.

For the production of individual bars, in each case, a wound bar or wound coil is insulated separately and—optionally with the further provision of coil-side corona shielding—is introduced into a slot in a plate stack, and is optionally welded thereafter to a mating component. In order to retain these windings in the slot with no subsequent complete impregnation of the fully-assembled machine, they are secured in the slot, either by means of a slot adhesive and/or—particularly in the case of large rotating electrical machines—in a mechanical manner by means of a slot packing strip.

Insulation systems for insulated coils which are inserted in slots are by no means restricted to the winding arrangement represented in FIG. 2—to date, this has simply been the customary variant. Research is being conducted into appropriate insulation systems for this purpose which employ an additive manufacturing process, together with coil insulation systems which are applied by spraying and/or powder coating. Individual coils or insulated individual bars can also be wound with mica tape, impregnated with resin, or provided with various surface coatings. These elements are thus fully insulated, externally to the slot.

However, the fixing of a coil or an individual bar which has been previously insulated—by whatever means—in a slot is disadvantageous, in that this process step is either executed mechanically, by means of a slot packing strip, and/or by a physicochemical method involving a slot adhesive, which is present in a semi-solid form, and the application of which by means of a spatula or a similar tool can only be automated in an unsatisfactory manner, such that the slot and/or the plate stack can easily be smeared.

SUMMARY

The teachings of the present disclosure can be used for an improved slot insulation system for individual coils and/or for the production of individual bars, which obviates both a slot packing strip and any "smearing" of a semi-solid electrically conductive adhesive employed for the attachment of the coil in the slot.

As an example, some embodiments of the teachings of the present disclosure include a slot insulation system of an electrical rotating machine comprising at least one coil which is insulated by a main insulation and/or an individual bar for a coil which is insulated in this manner, wherein a resin formulation forms the slot adhesive and is provided in the form of a solid film on the insulated coil, on the insulated individual bar, on the slot bottom and/or on the slot flanks such that, at room temperature and under standard conditions, particularly under standard pressure, the film is in the A-state and is present in the form of a solid and, in particular, non-adhesive film such that, by a corresponding heat-up of the electrical rotating machine to the curing temperature, this film is firstly melted and flows within the occupied slot, before curing and solidifying to form a thermoset material.

As another example, some embodiments include a method for producing a slot insulation system, comprising: providing a formulation for a slot adhesive, comprising a resin, a catalyst, optionally a hardener, additives and, optionally, electrically conductive fillers; mixing the formulation to form a powder coat; powder coating of an insulated coil and/or of an insulated individual bar and/or of one or more inner slot surfaces to form a solid film of slot adhesive; inserting the insulated and coated coil(s) and/or of the insulated and coated individual bar into an optionally partially or fully-coated slot; connecting the electrical rotating machine; and heating the fully-assembled electrical rotating machine in order to cure the film, wherein the film is firstly melted and flows before curing and solidifying to form a thermoset material.

As another example, some embodiments include a method for producing a slot insulation system, comprising: providing a formulation for a slot adhesive, comprising a resin, a solvent, a catalyst, optionally a hardener, additive(s) and, optionally, electrically conductive fillers; mixing the slot adhesive formulation to form a wet lacquer; spraying wet lacquer onto an insulated coil and/or an insulated individual bar and/or onto one or more inner slot surface(s) to form a solid slot adhesive film; inserting the insulated and lacquered coil(s) and/or of the insulated and lacquered individual bar into the optionally partially or fully lacquered slot; connecting the electrical rotating machine; and heating the fully-assembled electrical rotating machine in order to cure the film, wherein the film is firstly melted and flows before curing and solidifying to form a thermoset material.

DETAILED DESCRIPTION

Figure 1:
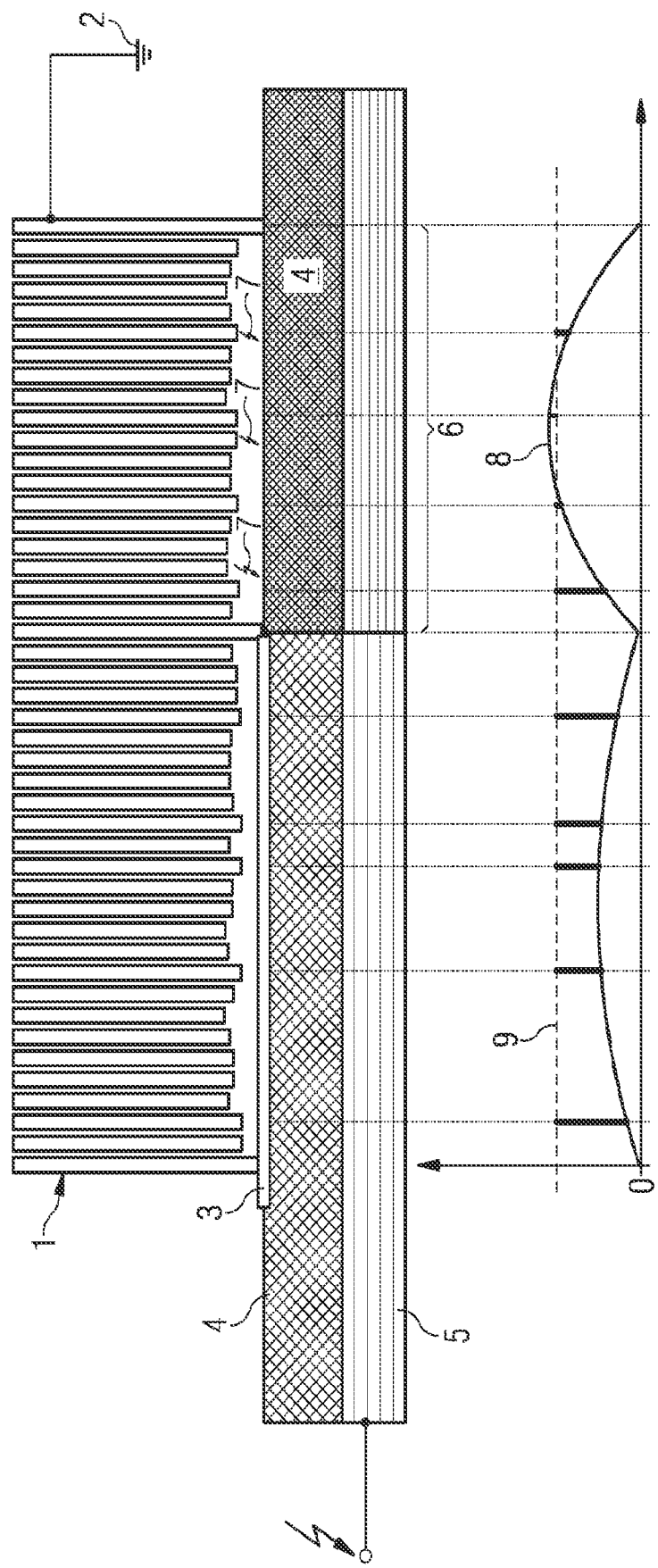
FIG. 1 represents a voltage characteristic comparing a coil-side corona shielding-coated and a non-coil-side corona shielding-coated individual bar of a machine having a design voltage in excess of 4 kV.

For the production of a film in the A-state in the form of a surface coating, either a resin formulation for a powder coating or a resin formulation for a wet lacquer may applied to the above-mentioned surfaces of the insulated coil, the insulated individual bar and/or the vacant slot. This solid and, in particular, non-drip and/or non-adhesive film then comprises a mixture of resin, hardener, additive(s), accelerants etc., and, optionally, electrically conductive fillers, wherein this mixture is not yet cured, and is thus reactive, such that it can still be melted and contains no or few cross-linked components. This generally corresponds to the A-state, although parts of the film may also be present in the B-state, i.e. in a partially cross-linked form. Both in the A-state and in the B-state, formulations of this type can still be melted.

The film is applied and produced in the A-state, in which it is solid, non-adhesive and/or non-drip, and generally smooth. Accordingly, a coil, or the corresponding individual bar, which is at least partially or entirely coated, or entirely uncoated with the film can be inserted into the internally coated, uncoated or partially coated slot wherein, at points which are coated with the film, no smearing of the formulation need be apprehended, as the film is solid and smooth.

Curing of the film is not executed until the stator is fully assembled and the electrical rotating machine is connected, such that it melts in the first instance, and is then cured to assume the C-state of the thermoset material. The C-state of a thermoset material is the maximum possible degree of cross-linking which can be achieved by curing a film in the A-state. The solidified thermoset material can no longer be melted and, additionally, is no longer reactive.

With regard to the manner in which the thermoset material is distributed in the slot and around the coil prior to curing, e.g. by way of evidence of the employment of the original technical instruction disclosed herein, it is evident that, in this case, solidification has been preceded by melting. Moreover, application of the solid film around the edges and corners of the slot is substantially cleaner such that, according to the disclosure herein, any smearing of surplus slot adhesive on the plate stack is reduced, in comparison with the prior art.

The formulation for forming the film comprises at least a resin, a hardener or otherwise, depending upon the form of polymerization, a catalyst, additives and electrically conductive fillers. In some embodiments, the film assumes the approximate composition of the coil-side corona shielding. Accordingly, coil-side corona shielding of a coil and/or of an individual bar which is insulated by the main insulation, prior to coating with the solid film according to the invention, can be omitted, and the coil is nevertheless ultimately present in the slot as a complete and insulated coil having coil-side corona shielding.

In some embodiments, additives, in particular additives having a rheological action, are further included. For example, the employment of thickeners, in particular "thickening agents", binders and/or associative thickeners is proven. These are linear or branched macromolecules, such as e.g. laminar silicates, bentonite, hectorite or hydrated $SiO_2$ particles. All additives which are employable in water-based lacquers and paints, in particular anti-settling agents, flow control agents, additives for the control of spray or spatter, etc., absorption agents for the prevention of the humidification and clumping of powders, etc., can be employed in this context. The respective selection thereof is dependent upon the composition of the formulation.

The expression "form of polymerization" describes the distinction between homopolymerization and addition polymerization. In addition polymerization, a hardener is provided in an approximately stochiometric quantity, which is the reagent in cross-linking or curing.

Figure 2:
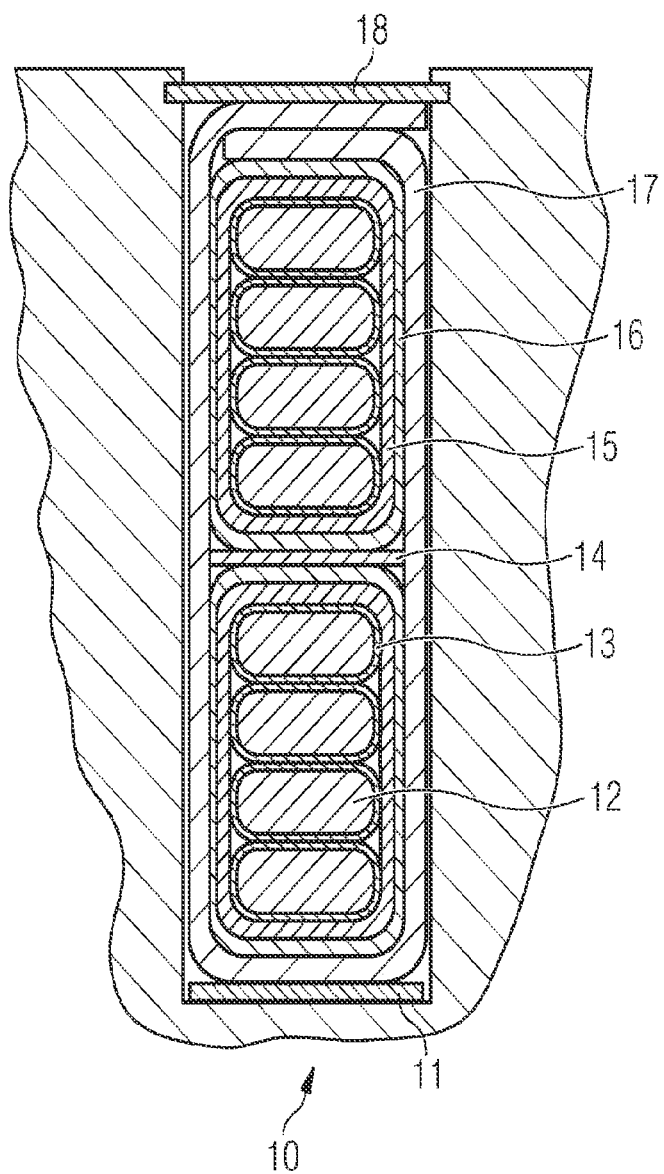
FIG. 2 shows a cross-section through a filled slot in a plate stack of the type represented in FIG. 1.

In some embodiments, the film, in its cured state as a thermoset material, assumes insulating properties and secures the insulated coil in the slot of the plate stack. It is particularly advantageous—c.f. FIG. 2, which represents the prior art—that a slot liner 17, which is present in the slot as a surface insulating material, can be replaced by the slot adhesive.

In some embodiments, the film, in its cured state as a thermoset material, assumes at least an equal square resistance to, or a higher square resistance than a coil-side corona shielding, in particular a square resistance in the range of 1,000 Ω to 1,000,000 Ω (ohms), in particular in the range of 1,000 Ω to 10,000 Ω. The term "square resistance" describes the "sheet resistance", with reference to a square. Sheet resistance describes the electrical resistance of an electrically conductive layer, the thickness of which is so small that only a parallel current flux to the layer occurs, i.e. current enters at one end face and exits at the opposing end face. As the unit of specific resistance "ρ" is the Ωm, the unit of sheet resistance is identical to the unit Ω (ohms) of electrical resistance.

The film can be applied, for example, in the form of a wet lacquer. In some embodiments, the film can be applied by spraying.

The resin in the formulation is selected, for example, from the group comprised of the following: epoxy, polyester, polyamide, novolac, polyurethane, polyvinylchloride, polyimide, siloxane and/or acrylic resin, and of any arbitrary blends and/or copolymers which can be produced therefrom—optionally incorporating further carbon- and/or silicon-based components.

The resin component, together with the other components, some of which—as per the resin—assume the form of a solid powder at room temperature and standard pressure, i.e. the optional hardener, catalyst, additive(s), fillers, etc., are dissolved in a solvent to produce the wet lacquer formulation, wherein at least the electrically conductive fillers, in general, are not soluble in any solvent which is customarily employed for the production of a wet lacquer formulation.

This solution is then provided as a wet lacquer formulation in a sprayable state, which can then be sprayed onto a—for example, heated—base surface which, as indicated, can be a ready—insulated coil, a ready-insulated individual bar and/or a slot in a plate stack. During spraying, and shortly after spraying, the solvent is vaporized such that, on the—for example, cooled—base surface, a solid dry film remains which contains all the components required to form a thermoset material and which, by the addition of corresponding fillers, can also be rendered electrically conductive.

In some embodiments, coil-side corona shielding on the main insulation of the coil can be entirely replaced by the film, or by the thermoset material which is formed therefrom, such that, in place of coil-side corona shielding on the main insulation of the insulated coil or the insulated individual bar, the solid film is applied, which is rendered electrically conductive by means of conductive fillers and which, further to curing, forms both the coil-side corona shielding of the coil and the means of attachment of the coil in the slot.

A base surface which is coated with the slot adhesive film—whether electrically conductive or otherwise—is solid and non-adhesive at room temperature, and can thus be easily handled, such that a coil which is fitted with the slot adhesive film in the A-state, or an individual bar which is coated therewith, can be introduced or inserted into the slot with no smearing or damage of the coating at the slot corners, etc. The individual bars are then welded/soldered to form coils, these coils are then contact-connected, and the electrical rotating machine, in a fully wired-up state, can be cured at a high temperature, for example between 100° C. and 250° C. Within this temperature range, the film which, in the A-state, is still solid and non-adhesive, firstly melts within the slot and/or on the coil. A liquid lacquer is formed as a result.

As a result of surface tension, the liquid lacquer forms a connection between the plate stack and the main insulation of the coil and/or optionally the coil-side corona shielding and then, for example after a few minutes, is cured to form a thermoset material, which can no longer be melted. This partially full-surface and partially sporadic bonding of the main insulation, the coil-side corona shielding and/or the overhang corona shielding of the coil is sufficient to provide a mechanically secure connection of the coil and the plate stack. This moreover permits an effective electrical contact-connection of the main insulation and/or the coil-side corona shielding of the coil with the plate stack, thereby reducing any air pockets. In any event, any air pockets present, if the slot adhesive is electrically conductive, are field-free, and there are no resulting electrical discharges—see FIG. 1.

By the heat-up of the fully wired-up electrical rotating machine, a thermoset material in the C-state is produced from the solid film in the A-state, by means of which the respective coil, via the main insulation, the coil-side corona shielding and/or the overhang corona shielding thereof, is secured in its respective slot.

It is also possible, in place of a wet lacquer, to employ a powder coating for the production of the film which, in the A-state, is solid at room temperature and under standard conditions, particularly under standard pressure.

Here again, components in the form of a resin, hardeners, where required, a catalyst, binders, additive(s) and electrically conductive fillers are mixed into a lacquering powder, which is applied in the form of a powder lacquering or powder coating to the base surface which, here again, can be an insulated coil, an insulated individual bar and/or an inner slot surface, such as a slot bottom or slot flank.

Powder lacquering or powder coating comprises the electrostatic application of a powder—the lacquer—to an electrically conductive base surface. Powder lacquering or powder coating comprises the electrostatic application of a powder—the lacquer—to the grounded base surface. Electrostatic charging of powder particles can be generated by the application of a high voltage (corona charging) or by friction (triboelectric or electrokinetic charging).

The lacquering powder employed for powder coating generally comprises dry granular particles, of size ranging from 1 µm to 100 µm. In chemical terms, these are generally based upon epoxy or polyester resins, but can also be based upon a polyamide, polyurethane, polyvinylchloride and/or acrylic, or upon any arbitrary mixtures, blends and/or copolymers which can be produced therefrom—optionally incorporating further carbon- and/or silicon-based components.

As binders for the powder coating, for example, polyimide, polyetherimide, polyesterimide and/or siloxane can further be added.

As a dielectric insulating filler, an arbitrary dielectric filler, for example based upon silicon dioxide, in particular quartz, can be added to the slot adhesive in the form of a wet lacquer or lacquering powder.

As an electrically conductive filler, for example, a carbon-based variant such as carbon black and/or graphite, but also graphene and/or carbon nanotubes, and/or a conductive doped metal oxide, such as antimony-doped tin oxide, can be employed.

The geometry of electrically conductive fillers is, for example, spherical and/or planar. A mixture of platelets and spheres if advantageous for the mutual contact-connection of fillers. The filler content can lie within a range of 1% by weight to 60% by weight, as a proportion of the dry matter content of lacquer.

After powder coating, a solid film is obtained which is solid at room temperature and under standard conditions, and which contains the thermoset material in the A-state.

The application of wet lacquer allows the coil or the individual bar to be inserted into a slot, and is optionally welded and connected. The finished electrical rotating machine is then cured at an increased temperature, here again at temperatures, for example, in the range of 100° C. to 250° C., thereby producing the thermoset material which secures the coil in the slot.

During curing, the solid film is then melted, such that the thermoset material is distributed and solidifies to form a thermoset material molding, which is no longer meltable.

Both the application of wet lacquer by spraying and powder coating can be executed both manually and automatically.

By the application of an electrically conductive solid film of a thermoset material in the A-state, under ideal circumstances partially in the B-state, essentially in a non-cross-linked state, the following advantages may be generated:

The coil can be very easily compressed into the slot, as the inner surface of the slot—wherever a film is present—having the film coating is smoother, and the sharp edges of the plate stack are covered by the film.

Melting of the film at the start of the curing process ensures the effective mechanical contact-connection of the plate stack and the coil.

In the fully wired-up rotating electrical machine, lacquer which is melted during the curing process, and is thus in liquid form, is compressed into those locations within the slot where it is required.

Mechanical stresses generated at points of excessive thickness are relieved by melting during the curing process. The lacquer is cured and solidified to form a thermoset material in a state of minimum stress.

In the case of a conductive slot adhesive, the air gap formed between the coil and the plate stack is field-free, and is thus electrically irrelevant—see FIG. 1—on the grounds that the plate stack and the surface of the coil (coil-side corona shielding) are at the same potential.

In the case of powder coating, surplus lacquering powder, which is not required for the formation of the film, can simply be extracted and returned to the powder reservoir, such that virtually no material losses occur, in comparison with semi-solid slot adhesives which have customarily been employed to date.

The film formation and coating process can be automated in a simple manner. The material employed for film formation, whether wet lacquer or lacquering powder, is relatively cost-effective with respect to its material price, in comparison with conventional slot adhesives.

The teachings herein include a slot insulation system for an electrical rotating machine having a rotor and a stator, wherein the stator comprises a plate stack with coils arranged in corresponding slots, wherein the coils are provided with an electrically conductive coating by way of coil-side corona shielding, and the slots are provided with a partial or full-surface electrically conductive coating, which also forms the basis for the coil-side corona shielding of the coils.

By means of the teachings disclosed herein, a technology is provided for the production of an insulation system in which a reactive and non-cross-linked thermoset material in the A-state is applied to the slot and/or to the coil in the form of a solid film. The attachment of the ready-insulated coil in the slot is thus improved and simplified, is rendered more cost-effective, and is suitable for automation.

What is claimed is:

1. A method for producing a slot insulation system for an electrical rotating machine, the method comprising:
   providing a formulation for a slot adhesive, the formulation including a resin, a catalyst, and a solvent;
   mixing the formulation to form a wet lacquer;
   applying the wet lacquer to an insulated coil and/or an insulated individual bar and/or one or more inner surfaces of a slot to form a solid film of slot adhesive;
   inserting the insulated and coated coil and/or the insulated and coated individual bar into the slot;
   connecting the electrical rotating machine;
   heating the fully-assembled electrical rotating machine to cure the film, wherein the film is firstly melted and flows before curing and solidifying to form a thermoset material.

2. A method for producing a slot insulation system for an electrical rotating machine, the method comprising:

providing a formulation for a slot adhesive, the formulation including a resin, a catalyst, and additives;
mixing the formulation to form a powder;
powder coating an insulated coil and/or an insulated individual bar and/or one or more inner surfaces of a slot to form a solid film of slot adhesive;
inserting the insulated and coated coil and/or the insulated and coated individual bar into the slot;
connecting the electrical rotating machine;
heating the fully-assembled electrical rotating machine to cure the film, wherein the film is firstly melted and flows before curing and solidifying to form a thermoset material.

3. The method as recited in claim 2, wherein, at room temperature and under standard conditions, the solid film is in an A-state.

4. The method as claimed in claim 3, wherein the resin formulation forms a lacquering powder.

5. The method as claimed in claim 3, wherein the resin formulation assumes a square resistance which is equal to, or higher than that of a coil-side corona shielding of the coil.

6. The method as claimed in claim 3, wherein the resin formulation assumes a square resistance within the range of 1,000 Ω to 1,000,000 Ω.

7. The method as claimed in claim 3, wherein at least one inner surface of the slot is coated with an electrically conductive film.

8. The method as claimed in claim 3, wherein the solid film and the resulting cured material comprise electrically conductive fillers comprising carbon black and/or graphite.

9. The method as claimed in claim 3, wherein the solid film and the resulting cured material comprise electrically conductive fillers comprising a doped metal oxide.

10. The method as claimed in claim 3, wherein the solid film and the resulting cured material comprise planar and/or spherical fillers.

11. The method as claimed in claim 2, wherein a coil is powder coated over its full surface.

12. The method as claimed in claim 2, wherein a bottom of the slot is powder coated over its full surface.

13. The method as claimed in claim 2, wherein flanks of the slot are powder coated over their full surface.

14. A method for producing a slot insulation system, the method comprising:
providing a formulation for a slot adhesive, the formulation including a resin, a solvent, a catalyst, and an additive;
mixing the slot adhesive formulation to form a wet lacquer;
spraying the wet lacquer onto an insulated coil and/or an insulated individual bar and/or onto one or more inner surfaces of a slot to form a solid slot adhesive film;
inserting the insulated and lacquered coil and/or the insulated and lacquered individual bar into the slot;
connecting an electrical rotating machine;
heating the fully-assembled electrical rotating machine to cure the film, wherein the film is firstly melted and flows before curing and solidifying to form a thermoset material.

* * * * *